United States Patent [19]
Uchino et al.

[11] Patent Number: 5,202,790
[45] Date of Patent: Apr. 13, 1993

[54] PHOTO-DRIVEN LIGHT BEAM DEFLECTING APPARATUS

[75] Inventors: Kenji Uchino, Yokohama; Kazuyasu Hikita; Yoshiaki Tanaka, both of Chichibu; Mikiya Ono, Tokorozawa, all of Japan

[73] Assignee: Mitsubishi Mining and Cement Company, Ltd., Japan

[21] Appl. No.: 530,294

[22] Filed: May 30, 1990

[30] Foreign Application Priority Data

May 30, 1989 [JP] Japan ................................. 1-134766

[51] Int. Cl.$^5$ .............................................. G02F 1/01
[52] U.S. Cl. .................................. 359/323; 359/245; 359/254; 359/322
[58] Field of Search ...................... 350/357, 355, 96.15; 250/338.4; 359/240, 244, 243, 254, 245, 322, 323

[56] References Cited

U.S. PATENT DOCUMENTS

| | | | |
|---|---|---|---|
| 2,836,652 | 5/1958 | Sprague | 350/355 |
| 4,152,597 | 5/1979 | Sher | 250/338.4 |
| 4,313,651 | 2/1982 | Miller, Jr. | 350/355 |

OTHER PUBLICATIONS

"Trial Construction of Whole Light Driven Electro-optical Device" Japan Physic Society 1987 p. 80.
Tanimura et al. "Effect of Impurity Doping on Photostriction in Ferroelectric Ceramics" Sensors and Materials 1. (1988) pp. 46–56.
Utsunomiya et al. "Prism-Type Optical Deflector Using PLZT Ceramics" Japanese Journal of Applied Physics vol. 24 (1985) pp. 169–171.

*Primary Examiner*—Rolf Hille
*Assistant Examiner*—Roy Potter
*Attorney, Agent, or Firm*—Hoffman, Wasson & Gitler

[57] ABSTRACT

A photo-driven optical deflecting apparatus in which a light beam is deflected by using only light beam(s), comprising (a) a dielectric substrate having "photovoltaic effect"; (b) one or more first couples of electrodes formed in or on at least a portion of the surface(s) of said substrate so as to polarize the portion(s) positioned between said couple(s) of the electrodes formed thereby; (c) one or more photo-driving or photo-receiving elements provided at least in the polarized portion(s) of the surface of said dielectric substrate, having a polarization direction oriented in one direction, and having photovoltaic effect so as to generate a voltage between said electrodes; (d) a dielectric and transparent prism having "electrooptic effect" through which a light beam to be deflected is passed and deflected, provided on the surface of said substrate, having a second couple of electrodes provided on a couple of the surfaces of the prism, which surfaces are parallel to the optic axis; and a polarizer provided on the surface through which said beam enters; (d) leads electrically connecting said first electrodes to said second electrodes; the light beam to be deflected enters through said polarizer into said prism through which the light beam passes to be deflected; and said prism being operated directly by the photovoltage generated by said photo-driving element(s).

10 Claims, 3 Drawing Sheets

PHOTO-DRIVEN LIGHT BEAM DEFLECTING APPARATUS

FIELD OF THE INVENTION

The present invention relates to a photo-driven optical deflecting apparatus in which a photo-beam can be directly deflected only by using another light beam, without any electrical modulator. Particularly, it relates to a miniature photo-driven optical switch which can easily be assembled on a very thin substrate.

DESCRIPTION OF THE PRIOR ART

Figure 1:
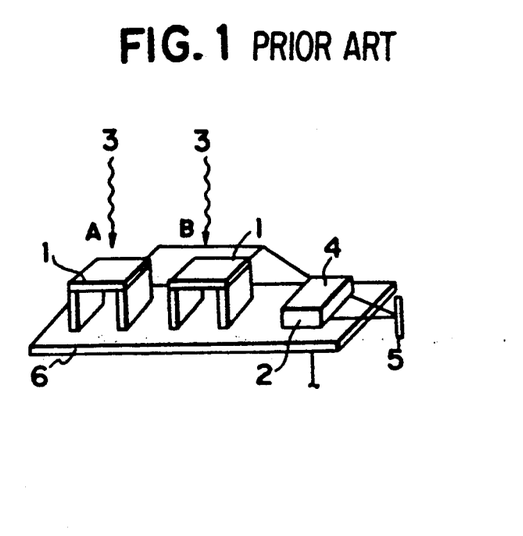
FIG. 1 shows schematically the structure of the prior art photo-driven apparatus.

A prototype photo-driven optical deflecting device was constructed using an element having a photovoltaic effect as the driver. An article, 27a-LJ-7, entitled "Trial Construction of Whole Light Driven Electro-optical Device" described at page 80 of the combined papers at a spring meeting of Japan Physic Society in 1987, and "Effect of Impurity Doping on Photostriction in Ferroelectric Ceramics" described in Sensors and Materials, 1 (1988) pp. 46–56, a whole light driven device in which "electrooptic effect" to change the refractive index of the material by applying an electric field in the material is used in combination with "bulk photovoltaic effect" to generate or induce the photovoltage the magnitude of which is well above the band gap energy of a piezoelectric crystal polarized material, thereby, a photo-shutter can be driven by the induced photo-voltage, and deflecting of light beam, i.e. red light beam can be deflected, even without any electrical device. Such apparatus is shown in FIG. 1 wherein a substrate 6 is a glass plate, and two photo-receiving ceramic parts (driving parts) A, B, are provided thereon. The device is operated such that a photovoltaic voltage or current is generated in the photo-receiving elements (driving parts) A, B by excitation due to irradiation from light of mercury lamp 3, and then, the electromotive force generated by such photovoltaic voltage will drive a light shutter 2.

Figure 2:
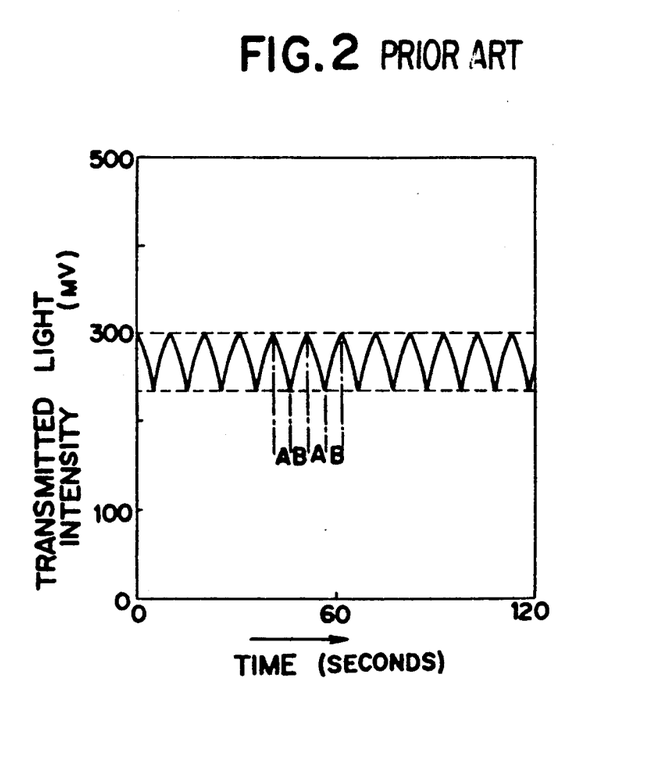
FIG. 2 shows a graph plotting the light intensity of a transmitting laser beam versus on-time for the prior art device.

Photo-receiving elements A and B are connected by an electric circuit in order to generate inverse photovoltaic voltage in each elements, and then, when the elements A and B are alternatively irradiated by deflecting a mercury lamp beam, the red light beam from He-Ne laser can be switched or deflected as shown in FIG. 2, to produce 0.2 Hz frequency light beam with a S/N ratio of about 2 dB. The material for the photo-receiving element(s) A, B is PLZT(3/52/48) comprising $Pb_{0.97}La_{0.03}(Zr_{0.52}-Ti_{0.48})_{0.9925}O_3$. The material for the photo-shatter 2 is PLZT (9/65/35) comprising $Pb_{0.91}La_{0.09}(Zr_{0.65}Ti_{0.35})_{0.9775}O_3$. Further, the effect of impurity doping on the photostriction in PLZT ceramics was studied on $WO_3$ doping to find that the doping less than 1.5 atomic percent of $WO_3$ can improve the photostriction as compared with no doping PLZT ceramics [refer to "Effect of Impurity Doping on Photostriction in Ferroelectric Ceramics" by M. Tanimura and K. Uchino, Sensors and Materials, 1, 46 (1988)].

Further, it is known that a triangle prism having the composition of PLZT(9/65/35) ( $Pb_{0.91}La_{0.09}(Zr_{0.65}Ti_{0.35})_{0.9775}O_3$) can deflect a light beam (see Japan, J. Appl. Phys. Suppl. Vol. 24, No. 3 pp. 169-171; 1985).

However, such known photo-driven optical deflectors seem to have the following shortcomings:

(1) Because a photo-receiving element is put on the surface of the material, the optical deflecting device cannot be miniaturized nor assembled in thin form.

(2) Because the lead is used, the assembling cost will be high.

(3) Because a red signal light beam (to be switched or deflected), and a light beam from a mercury lamp to drive the signal beam are incident mostly from the same direction, it is necessary to avoid confusion between the driving light and a light beam to be deflected.

(4) Because the light beam to be deflected enters at the direction to pass through the substrate, the beam to be deflected can be affected by the substrate, that is, the substrate should be transparent. Furthermore, if the substrate is of the material with less transparency, the S/N ratio of the photo-signal beam as deflected will be lowered, and in the other words, the selection of the material for the substrate will be restricted.

(5) Because the beam to be deflected passes through two polarizers in the known photo-driven optical deflector using whole light, the ratio of S/N of the photo-signal beam as deflected will be lowered. Furthermore, because the electrical amplifier to drive the prism of the latter device is used, the device cannot be miniaturized.

Many attempts have been made to resolve these problems in the structure and the operation of a photo-driven optical deflecting apparatus, but to date, none have been successful or commercially viable.

SUMMARY OF THE INVENTION

With the foregoing considerations in mind, the present invention is a photo-driven optical deflecting device using a piezoelectric material having "bulk photovoltaic effect", using $Pb_{0.97}La_{0.03}(Zr_{0.52}Ti_{0.48})_{0.9925}O_3$:PLZT(3/52/48) as a photo-receiving element. The present invention operates such that a photo-induced voltage will be generated in the photo-receiving element when radiation illuminates it, wherein the photo-induced voltage will drive a photo-deflector utilizing the "electrooptic effect".

The photovoltaic substrate used in accordance with the present invention has a bulk photovoltaic effect, and the term "photovoltaic effect" means a phenomenon in which voltage is generated in a dielectric material by exposing it to light, particularly to ultra-violet light. The electrooptic prism used in the inventive device has an "electrooptic effect" or "Kerr effect".

The term "electrooptic effect" refers to an "effect or phenomenon in which the change of birefringence $\Delta n$ occurs in the material to which the voltage or electric field is applied, stated thusly, $\Delta n = -\frac{1}{2} \times n_0^3 R_{33} E^2$, wherein $n_0$ is the index of refraction, $R_{33}$ is a quadratic electrooptic index, and E is the electric field".

In the inventive apparatus, the photo-voltage, on the order of kV/cm, is generated in the photo-voltaic element by exposing it to high energy radiation light, then, that voltage is applied between the electrodes mounted on the surfaces of the electrooptic prism to provide the change of birefringence so as to rotate the vibration direction of the polarized light, or to deflect the polarized beam.

Upon such deflecting of the light beam, an optical switch can be constructed utilizing a polarizer through which the light beam passes by shifting the direction of the beam such that the incoming polarized light will be deflected by the prism. Therefore, the term of "deflecting" hereinafter may include "changing the direction of the light beam".

Accordingly, it is an object of the present invention to provide a miniature photo-driven optical device operable only by a light beam which efficiently deflects the direction of a light beam, by arranging the direction of the self-polarization formed in the dielectric photo-receiving portions of a substrate.

It is another object of the present invention to provide a photo-driven optical deflecting device which can be easily miniaturized, and is light weighted and can be formed in integrated form.

It is a further object of the present invention to provide a photo-driven optical deflecting device whose structure can be easily fabricated by using leads or circuits formed on the surfaces of a substrate, thereby decreasing the number of the components used.

It is a further object of the present invention to provide a photo-driven optical apparatus which has high cost performance, high reliability, high operation features, and a high S/N ratio.

DETAILED DESCRIPTION OF PREFERRED EMBODIMENT

In accordance with the present invention, a photo-driven optical deflecting apparatus can deflect a light beam by irradiating the photo-driving of photo-receiving part(s) formed on a substrate. A light beam can be switched or deflected by an ultra-violet light beam falling on the photo-driving elements formed on the substrate.

The light beam to be deflected passes firstly through a polarizer to form a polarized beam, which then enters into the prism which changes its index of refraction. On the other hand, the surfaces of the photo-driving parts are parallel to the surface of said substrate, so that said light beam to be deflected enters from the direction in which there is no possibility of the beam entering, and the driving ultra-violet light beam enters from a direction different from that of the light beam to be deflected.

For improving the photo-voltage in this device, the number of the photo-receiving elements can be increased or the dielectric material to be used as the substrate is changed. For example, more $WO_3$ amount can be added to the material of PLZT(3/52/48).

The response velocity of the device can be improved by improving the geometry of the device.

Confusion of the light beams can be avoided by irradiating from the entirely different direction from each other of the irradiation beam and the light beam to be deflected.

The dielectric substrate having photo-induced voltage effect should have high photovoltaic effect. The most preferable composition of the photoelectric material is a piezoelectric material having the chemical formula $Pb_{0.97}La_{0.03}(Zr_{0.52}Ti_{0.48})_{0.9925}O_3$ with $WO_3$ doped.

The dielectric material should have high clarity. The most preferable material is a lanthanum-doped lead titanate zirconate having the chemical formula of $Pb_{0.91}LA_{0.09}(Zr_{0.65}Ti_{0.35})_{0.9775}O_3$.

The photo-receiving element(s) are formed in the surface of the dielectric substrate, then, a ceramic or crystal material comprising a light beam deflecting prism or deflector are provided on the surface of the same substrate, and then the photo-receiving elements and the prism are electrically connected on the same substrate.

The photo-receiving elements are irradiated to generate the photovoltage which operates the deflecting element of the inventive deflecting device, so that the inventive deflecting device is operated or controlled only by a light beam without any use of electrical amplifier and without any use of other mechanical means.

The beam passing through the polarizer is deflected by the prism mounted on the surface of the substrate. The driving light enters from the direction entirely different from that of the beam to be deflected, into receiving element(s) of the substrate. The beam passing through the prism or the deflecting device is parallel to the surface of the substrate, and the receiving elements comprise two portions which can be formed in the substrate.

The photo-driving elements provided on the surface of the substrate comprise a couple of optical elements having parallel and 180° opposite polarization direction to each other.

The photo-driving element comprises a couple of optical elements the polarization directions of which are in series, and connected in loop form. Each of the second electrodes of the prism is connected through each of said connecting leads to each of the first electrodes of said photo-driving elements.

Alternatively, the photo-receiving element(s) comprises a couple of optical elements the polarization direction of which are in parallel, and connected in loop form by electroconductive leads. Each second electrode of the prism is connected through each of the connecting leads provided on the surface of the substrate to each of the first electrodes of the photo-driving elements.

The photo-receiving elements which have "photovoltaic effect" function as a source for generating voltage to be applied to the electrodes for the prism to deflect the beam. The prism is made from PLZT material having high secondary electrooptic effect, and the index of refraction thereof can be shifted by application of an electric field. The geometry of the components in the apparatus are arranged so that there is no possibility of confusing the beam to be deflected and the incoming driving light beam.

Therefore, the light beam to be deflected enters the apparatus from the direction in which there is no possibility of the beam entering through the surface of the substrate, while the driving light beam enters from a direction entirely different from the direction of the light beam to be deflected.

The incoming surface and the outgoing surface of the prism are perpendicular to the surface of the substrate. The photo-receiving surface of the photo-driving parts is parallel to the surface of said substrate, so that the light beam to be deflected enters from the direction in which there is no possibility of the beam entering through the surface of the substrate, and the driving light beam incoming from the direction entirely different from that of the light beam to be deflected.

The photo-driving elements can be polarized having each polarization direction in series or parallel, by applying voltage between the first electrodes, and mounted on the surface of the substrate on which electrical circuits (leads) have been formed. After polarization of the photo-driving elements, the circuits are completed by soldering, so that the voltage generated between the first electrodes can be applied to the second electrodes of the prism.

The prism is mounted and positioned on the surface of the substrate so that the beam to be deflected enters in parallel to the surface of the substrate. The second couple of electrodes are provided on the surfaces of the prism which are parallel to the beam to be deflected, and are connected through the leads to each of the first electrodes of the receiving elements.

The material of the receiving elements can be the same as that of the substrate itself, and therefore the construction of the photo-driven apparatus can be simplified.

The material PLZT(3/52/48) with $WO_4$ doped up to 2.0 atomic percent, as well as PLZT can be used for the material of the photo-receiving elements. However, $WO_4$ doping will improve the bulk effect of photovoltage.

Figure 3:
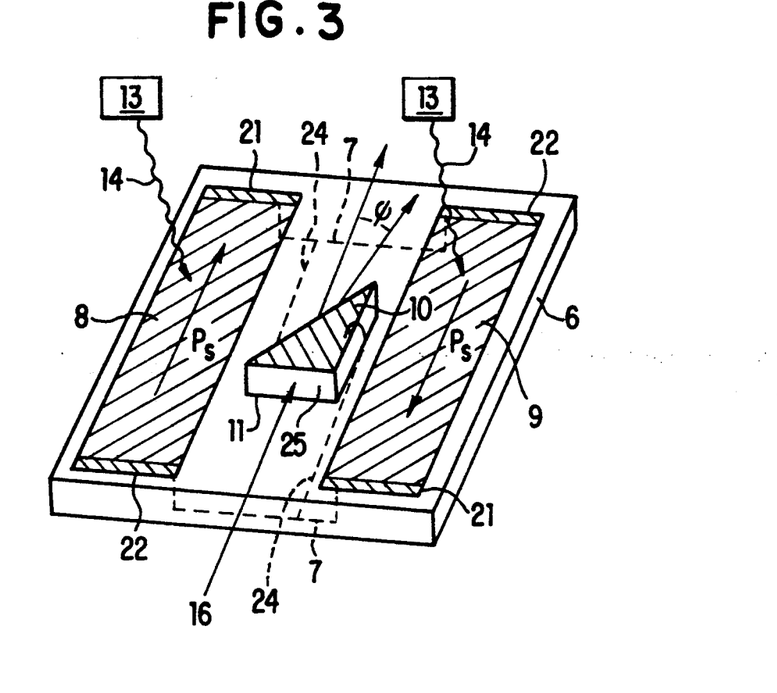
FIG. 3 is a view showing schematically the construction of the inventive photo-driven optical deflecting device.

FIG. 3 shows schematically the inventive photo-driven optical deflecting device. In the construction, 6 is a dielectric substrate capable of photo-voltaic effect generated by polarization, and 7 is electric leads formed on the surface of the substrate, connecting the electrodes of the photo-receiving elements 8 and 9, so that the directions of the polarization in the elements is in series (inverse parallel) and the second electrodes of the deflector are connected respectively to the first electrodes of the photo-receiving elements through the leads 7 formed on the surface of the substrate. The leads 7 connect through the circuits 24 formed on the back surface of the substrate 6 to the electrodes 10 and 11 formed on the surfaces of the prism 25.

The prism 25 is provided on the surface of the substrate 6 and oriented so that a light beam 16 passes through the polarizer 12 parallel to the surface of the substrate 6, and enters into the prism 25. The electrodes 10 and 11 are on the surfaces of the substrate 6, and produce an electric field in the direction perpendicular to the direction of the light beam passage. Each of the electrodes 10 and 11 is connected respectively to each of the electrodes of the photo-receiving elements 8 and 9 as shown.

A beam 16 enters parallel to the surface of the substrate, enters into prism 25, and is deflected at the angle of $\Psi$ depending on the index of refraction of the prism 25. The driving light 14 from a light source such as a mercury lamp 13 is applied to the receiving elements A and B, portions of the substrate 6, thus causing a photovoltage to be generated between the electrodes 21 and 22 formed on the surface of the substrate 6. Then, this voltage is applied between the electrodes 10 and 11 of the prism 25, so as to shift the index of refraction of the prism, thereby shifting the deflecting angle, $\Psi$.

Figure 4:
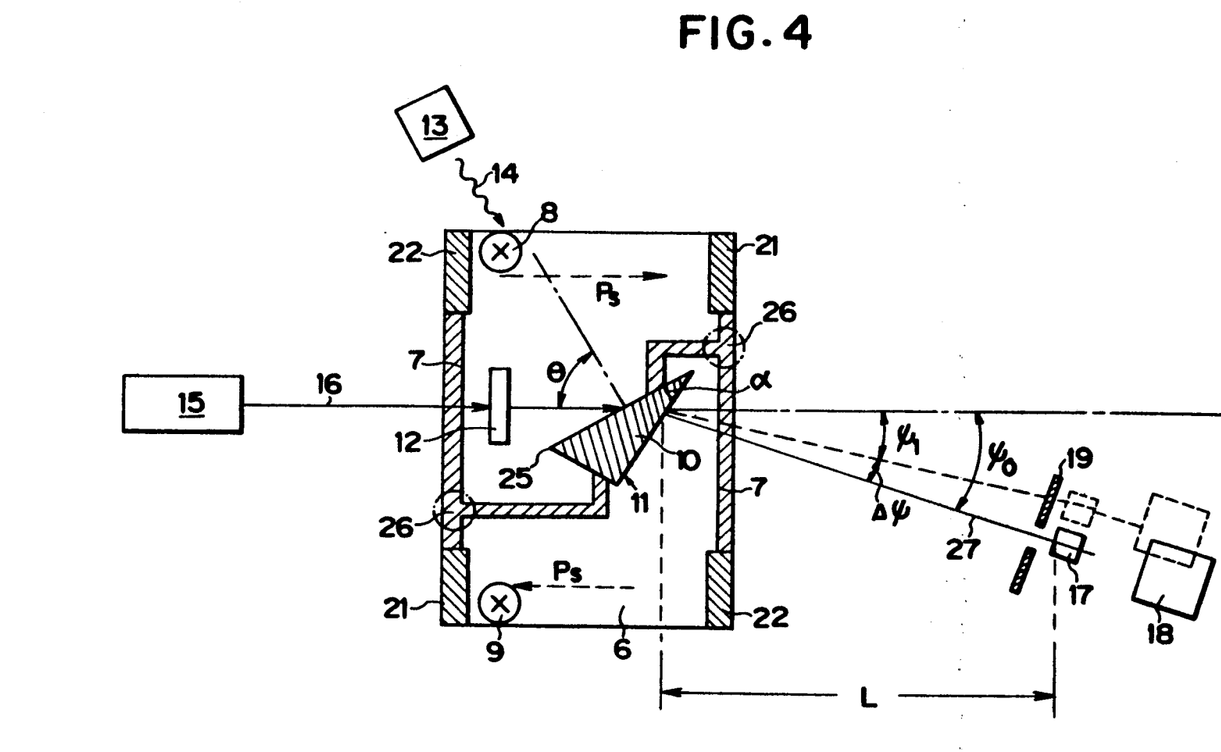
FIG. 4 shows an apparatus for measuring the performance of the inventive photo-driven optical deflecting device.

In FIG. 4, the driving light 14, preferably from a mercury lamp 13, irradiates the surface of the substrate.

An apparatus for measuring the performance of the inventive photo-driven optical deflecting device is also shown in FIG. 4. A He-Ne laser 15 emits a light beam 16 to be deflected. The beam 16 is parallel to the surface of the substrate 6, and enters into the prism 25. The electrodes 21 and 22 of respective receiving elements 8 and 9 generates a voltage by irradiation with the light 14. The voltage is applied between the electrodes 10 and 11 of the prism 25 to produce the electric field in the direction perpendicular to the beam 16. The electrodes 10 and 11 are provided on both surfaces of the transparent dielectric body (prism) 25, and each electrode 10, 11 is respectively connected to the electrodes 21 and 22 of the substrate 6 through the leads 7, as shown in FIG. 4.

A sensing device 17 senses the intensity of the deflected light beam, while a computer 18 records the data obtained by the sensing device 17. The mercury lamp 13 continues to produce a driving light beam 14. The driving light beam 14 illuminates either or both of the photo-receiving parts 8 and 9.

The principle of the inventive photo-driven optical deflector will be illustrated as follows by using the measuring device as shown in FIG. 4.

The beam 16 enters the prism 25, and then, is deflected in accordance with the index of refraction of the prism 25. Then, when the driving light 1 irradiates the receiving element 8, a photovoltage, V+, is generated between the electrodes 21 and 22 by photovoltaic effect. Then, that voltage is applied between the electrodes 10 and 11 of the prism 25 through the leads 7. The beam 16 passes through a polarizer 12, and is deflected through the prism 25 to which the electric field is applied. The index of refraction of the prism 25 has been shifted due to the electrooptic effect of the dielectric material by the application of the electric field. The direction of the beam 16 is changed depending on the shift of the index of refraction of the prism 25, while the passage of the beam 16 can be switched or changed by controlling the irradiation with the light 14.

In other words, when the photo-receiving part 8 is irradiated with a light beam 13 from a mercury lamp 14, the voltage generated due to a bulk photostrictional voltaic effect is applied to the electrodes of the prism 25 through the leads 7, and then, the light beam 16 being polarized linearly by the polarizer 12 enters and passes through the field-applied prism 25 so as to produce a light component being capable of deflecting the light beam.

The photovoltaic portion of the substrate has a bulk photovoltaic effect. The term "photovoltaic effect" means a phenomenon in which voltage is generated in a dielectric material by exposing to a light, particularly to an ultra-violet ray. The electrooptic prism to be used in the inventive device has "electrooptic effect" or "Kerr effect".

The shift, $\Delta n$ of the index of refraction n of the prism, is generated by the "electrooptic effect" in the prism ("effect or phenomenon in which the change of birefringence, $\Delta n$, occurs in the prism) to which the voltage or electric field is applied, according to the following formula:

$$\Delta n = -(\tfrac{1}{2})n_0^3 R_{33} E^2$$

wherein $n_0$ is the index of refraction of the prism when voltage is not applied to, $R_{33}$ is a quadratic electrooptic index, and E is the electric field.

When the light 14 from the mercury lamp 13 is changed to irradiate the photo-receiving element B (9), the reverse photovoltage, −V, on the photo-receiving element 8 is generated because the polarization of the part 9 is opposite to that of the part 8. The reverse voltage −V is applied to the electrodes of the prism 25 so as to produce the reverse electric field in the prism 25. Therefore, the beam 16 is shifted reversely. Accordingly, the changing of the radiation of the light from the photo-receiving element 8 to the element 9 will change the direction of the light beam by deflecting it.

In view of the foregoing, the inventive apparatus can control a light beam by another light.

When the photo-receiving part is not irradiated, the beam 16 is not shifted, thus the light beam 16 does not reach to the device 17. When the photo-receiving part is irradiated, the beam is shifted. Thus the light beam 16 reaches to the device 17, so that the light beam 16 can be controlled or shifted to produce a signal in the device 17 by operating with the input light 13. Accordingly, when the photo-receiving part is not irradiated, the device is "on".

Further, when the light 14 irradiates the photo-receiving element 8, the beam 16 enters into the device, thereby turning it "on". In other words, when the light 14 irradiates the photo-receiving element 9, the beam 16 does not enter the device. Thus the device remains "off".

Whether or not the driving light irradiates the photo-receiving element(s) determines the "on" or "off" state of the device. Therefore, the inventive apparatus can function as a photo-switch operable by the other light.

When the photo-receiving elements 8 and 9 are connected in parallel and irradiated simultaneously by the driving light, the operation rate will be faster than when either one of the elements A and B is irradiated. That is to say, the operation sensitivity of the apparatus can be improved.

The apparatus can be constructed such that if the element 8 is irradiated, the device is "off", while on the other hand, if the element 9 is irradiated, the device is "on". Such construction of the apparatus can enable larger shift of the deflected angle.

Further, the prism 25 can be made in thin layer through which a beam such as a red light can pass. The total size of the apparatus can be thinner, and furthermore, the response time of the apparatus can be improved.

An optical fiber can be used to introduce the driving light from a suitable source to the photo-receiving element(s), thereby improving the intensity of the driving light irradiating the element(s). Then, deflection of the beam can occur at a higher rate.

The photo-driven optical apparatus uses the photo-receiving elements 8, 9 provided on or in the portions of the dielectric substrate having "photovoltaic effect" as an actuator. The prism (deflector) made of PLZT ceramics is located on the surface of the dielectric substrate, and the geometry thereof being chosen so that the beam to be deflected does not interfere with the driving light. Accordingly, the following improvements can be expected:

(1) a beam such as red light beam can be controllably deflected by introducing a driving light such as an ultraviolet ray, without an amplifier;

(2) the S/N ratio is improved such that the S/N ratio obtained by one passage through this apparatus is higher than that obtained by twice passage through a photo-shutter;

(3) because the receiving elements are formed on portions of the substrate having bulk photovoltage effect, reduced size, light-weight and thin layer formation can be easily accomplished;

(4) because the beam to be deflected is incident parallel with the surface of the substrate, an opaque substrate can be used;

(5) control circuits or leads can be formed on the surface(s) of the substrate, the wiring steps or leads formation can be simplified, and high reliability and high cost performance can be accomplished;

(6) tungsten oxide dopant can improve the bulk photo-voltage of PLZT ceramics.

The material of the prism (deflector) can be the same as that of the substrate, such as lanthan-added lead zirconate titanate (PLZT-(9/65/35). The apparatus can be unified and manufactured by firing one ceramic unit. Therefore, simplification of the manufacturing steps and improvement of cost performance can be expected.

The photo-driven apparatus can be utilized as an optical sensing device, and a basic circuit for an optical processor. Further, the prism can be formed of a thin layer by using a spattering technique and CVD method, so as to form a passage for red light beam, thereby improving overall performance. Furthermore, the introduction of a beam from a source into an optical fiber will improve the intensity of the driving light, thus, high speed processing can be accomplished.

The present invention is further illustrated by the following example showing the structure of the inventive apparatus. However, the Example should not be interpreted as a limitation of the invention.

EXAMPLE

A photo-driven device having the structure as shown in FIG. 3 was manufactured as follows:

First of all, a ceramic substrate 6 was made into a plate of 2.5 cm×2.5 cm having the following composition:

Lead titanate zirconate of the ratio of Zr to Ti being 52:48 in which 3 atomic percent of La is substituted in place of Pb site, and having the formula:

$Pb_{0.97}La_{0.03}(Zr_{0.52}Ti_{0.48})_{0.9925}O_3$

[hereinafter, refer to as PLZT(3/52/48)]. A composition of sintered plate, was used as a substrate 6, and on the surface thereof was formed circuit pattern(s) 7, as shown in FIG. 3, made by using a silver-palladium paste, and firing so as to form the circuit patterns 7.

Photo-receiving elements 8 and 9 were formed having an electrode distance of 16 mm and an electrode size of 5 mm×1 mm, and two couples of first electrodes 21 and 22.

Then, a ceramic material of the composition:

$Pb_{0.91}La_{0.09}(Zr_{0.55}Ti_{0.35})_{0.9775}O_3$

[hereinafter, refer to as PLZT(9/65/35)] in which 9 atomic percent of La is substituted in place of Pb site in a crystal of lead titanate zirconate, and a ratio of Zr to Ti is 65:35, which crystal is transparent and has a prism form. Then, silver palladium paste is applied in an area measuring 4 mm×15 mm, and fired to form second electrodes 10 and 11. The prism has a triangular crosssection, measuring 4 mm × 6.9 mm × 8 mm, height of 0.7 mm, and an apical angle α of 30° (degree).

The beam 16 enters into the prism 25 at an incidence angle θ. The prism 25 is assembled on the surface of the substrate 3, as shown in FIG. 4, and is connected by using an adherent agent on the surface.

The incident angle θ is selected to be 0°, 15°, 30°, 45°, 60°, 70°, and 85°, so as to carry out the experiments. When the incidence angle is more than the critical angle of 85°, the beam 16 is reflected at the surface of the prism, and the function of the apparatus could not be confirmed. Both the incidence surface and the exit surface should be perpendicular to the surface of the substrate 6 and smooth so that no reflection nor scattering of the beam 16 occurs.

The surface of the substrate 6 carries a polarizer 12 made of a resin plate such as one made by "Polaroid (Trademark)" bonded to the surface by adhesive agent. The surface of the polarizer 12 should be perpendicular to the surface of the substrate 6. The adhesives should be applied so as to avoid the area through which the signal light passes.

Photo-receiving elements 8 and 9 are formed between the electrodes 21 and 22, and are polarized by applying an electric field of 3 kV/mm, so as to form a polarization pattern direction that is opposite from, but parallel to, the direction of elements 8 and 9. After polarization of the photo-receiving elements 8 and 9, the electrodes 21 and 22 were connected to circuits. The directions of polarization of the elements 8 and 9 act series, by connecting together the circuits shown at locations designated 24 with solder and the like, so as to form electric circuits 7 as shown in FIG. 4. Then, a silver paste or solder curable at room temperature can be used to connect the electrodes of the prism to the circuit pattern 7.

The operation characteristics of the apparatus shown in FIG. 3 was measured by the method as shown in FIG. 4. A red laser beam 16 was used as a signal light for taking measurements generated from He-Ne gas laser. The direction angle Ψ of the signal light 16 having passed through the prism 10 was measured by a photo-detector 17. Then the data as detected was processed by a computer 18 and stored.

The red light beam 16 passing through the polarizer 12 and the prism 25 is deflected at an angle Ψ to the incidence direction. The deflected angle of the beam passing through the prism 25 with respect to the direction of the original beam 16 is $\Psi_0$ when the electric field is not applied to the prism 25, and is shifted into $\Psi_1$ by applying the field to the prism 25 so as to shift the direction of the beam, and the difference or the shifted angle is ΔΨ.

The beam 27 passes through a slit 19 and is detected by a photo-detector 17 located on the substrate 6 at a distance L from the prism 25, and the measured data was recorded by the device 18. The photo-intensity was measured, and the position at which the photo-intensity was maximum was determined so as to give the angles $\Psi_0$ and $\Psi_1$. The shifted angle ΔΨ equals the difference between $\Psi_0$ and $\Psi_1$.

The photo-receiving elements 8 and 9 were alternatively or together exposed to radiation from a mercury lamp 19, and the deflecting angle with respect to the prism 25 was measured.

Figure 5:
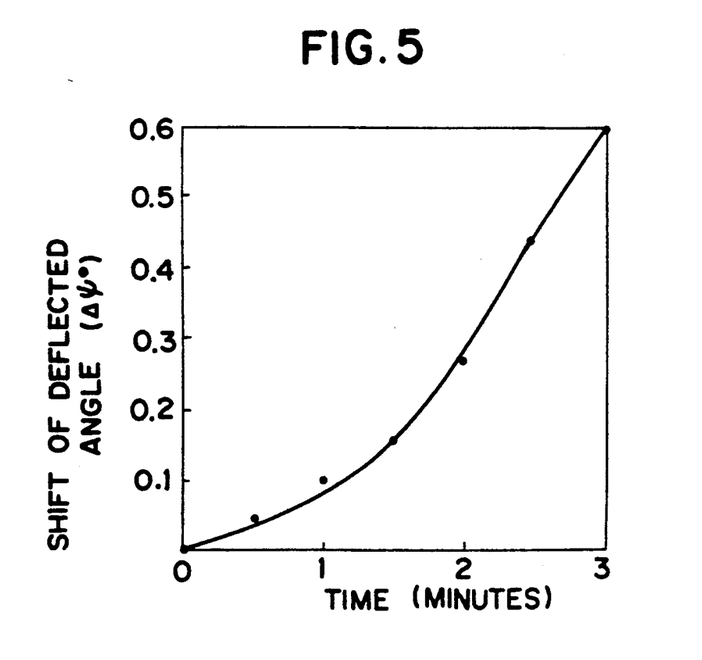
FIG. 5 shows a graph plotting the shift of the deflected angle of the laser beam versus the on-time period in minutes for the inventive photo-driven optical deflecting device.

The resulting response is shown in FIG. 5 which is a graph plotting the shift of the angle of a laser beam versus the on-time period resulting from the whole light driven device.

When the driving light 14 is applied to the element A (8), the angle or position of the detector 17 is determined by moving the detector 17 in the plane of the substrate 6 along a line passing through the center of the prism 25. The polarization direction of the polarizer 12 is perpendicular to the surface of the substrate 6, and parallel to the field direction in the prism 25. When the incidence angle θ is 60°, the maximum shift ΔΨ of the deflecting angle θ can be reached, and the maximum shift ΔΨ of 0.6° was reached within three minutes of irradiation.

The relation between the time of irradiation and the shift ΔΨ of the deflecting angle is shown in the graph of FIG. 5.

The shift ΔΨ was increased with passage of irradiation. the inventive photo-driven apparatus has such function.

Further, when the light from the mercury lamp is changed to the receiving element B (9), the shift ΔΨ is decreased.

The sensor 17 is fixed at a position $\Psi_1$ so that the beam exiting from the prism 25 evidences maximal intensity, when the driving light 14 is not applied. But when the receiving element A was irradiated by the driving light 14, the deflecting angle of the beam 16 was shifted so as to decrease the intensity received by the detector 17.

It is apparent from this example that because the substrate 6 itself is a piezoelectric body, the formation of the photo-receiving elements can be accomplished by forming electrodes on the surfaces of the substrate 6, and polarizing the portions between the electrodes so as to produce the desired properties of the photo-receiving elements. Therefore, the manufacture of the elements can be facilitated, so that the miniaturization of the device can be easily accomplished. Assembling the substrate with a transparent dielectric prism 25 is expedited by adhering together with glass paste. Alternatively, the assembling can be accomplished by firing together at a temperature of 1,000° to 1,300° C. to sinter together or solder together, because both of the substrate 6 and the prism 25 are of similar material, that is, PLZT composition.

In this procedure, two kinds of PLZT compositions were connected or integrated together. Circuit patterns can be formed, along with polarization of the elements, and the formation of the electrodes can be accomplished. Connection of the electrodes with the circuits and the polarizer is also located on the surfaces of the substrate.

Doping of the PLZT(3/52/48) with 0.5 atomic percent of $WO_3$ can be used in place of the PLZT(3/52/48).

The result is such that the S/N ratio obtained from the 1.0 and 1.5 atomic percents $WO_3$ doping PLZT(3/52/48) substrate is higher than that obtained from the non-doping substrate, and the S/N ratio obtained from the 2.0 atomic percent $WO_3$ doping PLZT(3/52/48) substrate is competitive with that from the non-doping substrate. Furthermore, the S/N ratio of the 2.5 atomic percent $WO_3$ doping substrate is lower than that of the non-$WO_3$ doping substrate.

The preferable doping range for $WO_3$ is 0 to 5.0 atomic percent, and the improvement of S/N ratio by $WO_3$ doping is readily achieved.

The substrate 6 is 20 mm long, 15 mm wide and 0.5 thick. The electrodes 21 and 22, each having size of 5 mm × 1 mm are provided on the surface of the substrate 6 with the distance between both electrodes being 16 mm. The circuits 7 for the prism 25 are formed on the surface of the substrate 6. The photo-receiving elements 8 and 9 are formed between the electrodes 21 and 22 and are polarized opposite but parallel form to each other, as shown in FIG. 3.

A prism of the composition PLZT(9/65/35) is used for the prism 25. The electrodes 10 and 11 are formed on both surfaces of the prism 25, which may be adhered on the substrate 6. The electrodes 10 and 11 were connected to the circuits 7 by solder or conductive paste, and the photo-receiving elements 8 and 9 were polarized and connected together in series form.

The electrodes 21 and 22 for the prism 25 may be electrically connected to the first electrodes in parallel form.

The photo-receiving elements 8 and 9 are exposed to radiation of mercury lamp 13 so as to generate a photovoltaic current and voltage in the circuits 7.

A light beam 16 to be deflected enter into the prism 25 at a direction perpendicular to the direction of the self-polarization of the substrate 6 as shown in FIG. 3, and therefore, the risk of optical confusion is very small.

Operational performance is measured as shown in FIG. 4. specifically, two photo-receiving elements 8 and 9 are simultaneously exposed to a driving radiation 14, so as to measure the performance of the inventive photo-driven optical deflecting apparatus.

It is apparent that the use of the parallel arrangement of the two photo-receiving elements 8, 9 having the same self-polarization direction for detecting photo-irradiation, can enable more rapid response for opening of a shutter.

FIG. 5 is a graph showing response of the present invention when the device is irradiated.

Each of the states in which the driving light 14 is applied to the receiving element 8, 9 can correspond respectively to an "on" state or an "off" state. therefore, the inventive apparatus can act like a photo-switch operable by an optical beam or a light.

The receiving elements 8, 9 are formed in parallel polarization by connecting the first electrodes to the polarization source. The receiving elements 8, 9 are irradiated simultaneously by the driving light. Fast switching operation can readily be accomplished, and the sensitivity of the operation can be easily improved.

Light from the mercury lamp source 13 can be introduced through an optical fiber, so as to improve the intensity of the light irradiating the receiving elements. Thus, the acceleration of processing or deflecting processing can be obtained.

As described in the foregoing, the inventive photo-driven optical device can greatly improve the bulk photostrictive force of a photo-driving element. The device can also improve the S/N ratio and the response of an optical switching by using lanthanum added lead titanate-zirconate doped with $WO_3$ up to 2 atomic percent [$WO_3$-doped PLZT(3/52/48)].

While the present invention has been described with reference to the particular illustrative embodiments, the invention is not to be restricted by those embodiments. It can be appreciated by those having ordinary skill in the art that changes or modification to the presented embodiments may be made without departing from the scope and spirit of the present invention.

We claim:

1. A photo-driven apparatus in which a light beam is deflected by only using light beams, comprising:

(a) a planar dielectric substrate having a photovoltaic effect;
   (b) at least one pair of first electrodes formed on at least portions of the upper surface of said substrate so as to polarize that portion of said substrate positioned between said pairs of said first electrodes such that a photovoltaic effect is generated at the portion between the pair of first electrodes;
   (c) at least one photo-receiving element located on the upper surface of said dielectric substrate, between said pairs of first electrodes, having a polarization direction arranged in one certain direction, and having a photovoltaic effect so as to generate a photo-voltage between the pair of first electrodes;
   (d) a dielectric transparent prism having upper and lower surfaces and electrooptic effects, located on the upper surface of said substrate, having a second pair of electrodes provided on two of the surfaces of the prism, which surfaces of said prism are parallel with the optic axis of a first light source, and a polarizer provided on the surface of said prism through which said beam enters;
   (e) leads electrically connecting the first pair of electrodes of said photo-receiving element, respectively, to said second pair of electrodes of said prism;

whereby the light beam to be deflected enters through the polarizer into said prism through which the light beam is deflected; and said prism being operated directly by the photovoltage generated by said photo-receiving element which can be operated only by illumination of a light beam to the surface of said photo-driving element.

2. The photo-driven apparatus in accordance with claim 1, wherein said prism has an input surface and an output surface for said light beam to be deflected.

3. The photo-driven apparatus in accordance with claim 1, wherein said second pair of the electrodes are facing each other on said upper and lower surfaces on said prism to apply an electric field to said prism.

4. The photo-driven apparatus in accordance with claim 1, wherein said photo-receiving element is provided on the upper surface of said substrate and comprises a pair of optical elements having parallel and opposite polarization directions to one another.

5. The photo-driven apparatus in accordance with claim 1, wherein said photo-receiving element comprises a pair of optical elements, the polarization directions of which are in loop form, and each of the second pair of electrodes of said prism is connected through connecting leads to the first pair of electrodes of said photo-driving elements.

6. The photo-driven apparatus in accordance with claim 1, wherein said photo-receiving element comprises a pair of optical elements, the polarization direction of which are in parallel, and connected in loop form, and each of the second pair of electrodes of said prism is connected through connecting leads provided on the surface of the substrate to each of the first pair of electrodes of said photo-driving elements.

7. The photo-driven apparatus in accordance with claim 1, wherein said light beam to be deflected enters from the direction substantially parallel to the surface of said dielectric substrate.

8. The photo-driven apparatus in accordance with claim 7, wherein the input surface and the output surface for the light beam to be deflected in said prism are perpendicular to the surface of said dielectric substrate and said at least one photo-receiving element of the photo-driving apparatus is parallel to the surface of said substrate, so that said light beam to be deflected enters from a direction substantially parallel to the surface of said dielectric substrate.

9. The photo-driven apparatus in accordance with claim 1, wherein said dielectric substrate having a photovoltaic effect is of piezoelectric material having the chemical formula:

$$Pb_{0.97}La_{0.03}(Zr_{0.52}Ti_{0.48})_{0.9925}O_3;$$

and said prism with high clarity being of lanthanum-doped lead titanate zirconate having the chemical formula of:

$$Pb_{0.91}La_{0.09}(Zr_{0.65}Ti_{0.35})_{0.9775}O_3.$$

10. The photo-driven apparatus in accordance with claim 1, wherein said dielectric substrate is of a piezoelectric material having the chemical formula:

$$Pb_{0.97}La_{0.03}(Zr_{0.52}Ti_{0.48})_{0.9925}O_3;$$

and further comprising a dopant of $WO_3$, wherein said composition contains 0–2 atomic percent $WO_3$.

* * * * *